US012338846B2

(12) United States Patent
Sicre

(10) Patent No.: US 12,338,846 B2
(45) Date of Patent: Jun. 24, 2025

(54) REUSABLE, LOW-SHOCK HOLD AND RELEASE DEVICE

(71) Applicant: Centre National d'Études Spatiales CNES, Paris (FR)

(72) Inventor: Jacques Sicre, Toulouse (FR)

(73) Assignee: Centre National d'Études Spatiales CNES, Paris (FR)

( * ) Notice: Subject to any disclaimer, the term of this patent is extended or adjusted under 35 U.S.C. 154(b) by 457 days.

(21) Appl. No.: 17/967,274

(22) Filed: Oct. 17, 2022

(65) Prior Publication Data

US 2023/0037250 A1    Feb. 2, 2023

Related U.S. Application Data

(63) Continuation of application No. PCT/FR2021/050668, filed on Apr. 15, 2021.

(30) Foreign Application Priority Data

Apr. 16, 2020  (FR) ..................................... 20/03837

(51) Int. Cl.
*B64G 1/64* (2006.01)
*F16B 2/12* (2006.01)
*B64G 1/22* (2006.01)

(52) U.S. Cl.
CPC .............. *F16B 2/12* (2013.01); *B64G 1/2222* (2023.08); *B64G 1/2228* (2023.08); *B64G 1/6457* (2023.08); *F16B 2200/77* (2023.08)

(58) Field of Classification Search
CPC ...... F16B 2/12; F16B 2200/77; B64G 1/2228; B64G 1/2222

(Continued)

(56) References Cited

U.S. PATENT DOCUMENTS 5,160,233 A * 11/1992 McKinnis ............... F16B 31/00
411/909
5,718,531 A    2/1998 Mutschler, Jr. et al.
(Continued)

FOREIGN PATENT DOCUMENTS

CN    106335653    1/2017
CN    109131951    1/2019
(Continued)

OTHER PUBLICATIONS

International Search Report issued in corresponding International Application PCT/FR2021/050668, mailed Jul. 13, 2021.

*Primary Examiner* — Todd M Epps
(74) *Attorney, Agent, or Firm* — Burris Law, PLLC; Stephenie L. W. Serman

(57) ABSTRACT

A reusable device for holding and releasing a bar. The device includes a tightening component, a hold and release component, and at least one loosening component. The hold and release component includes a plurality of segments, each segment includes a first bearing surface configured to bear on part of the bar, when the plurality of segments is in a holding configuration under the effect of a tightening pressure generated by the tightening component. The plurality of segments includes a second bearing surface configured to bear on one end of the at least one loosening component. The at least one loosening component is made from a first single-acting shape memory material. Each end of the at least one loosening component exerting a loosening pressure compensating for the tightening pressure, so as to place the hold and release component in a configuration in which the part of the arm is released.

8 Claims, 5 Drawing Sheets

(58) Field of Classification Search
USPC .................................. 248/229.2; 244/137.4
See application file for complete search history.

(56) References Cited

U.S. PATENT DOCUMENTS

| | | | | |
|---|---|---|---|---|
| 5,718,561 A | * | 2/1998 | Fischer | ................ F04D 23/008 |
| | | | | 415/214.1 |
| 6,126,115 A | * | 10/2000 | Carrier | ................ B64G 1/6457 |
| | | | | 294/82.26 |

FOREIGN PATENT DOCUMENTS

| | | |
|---|---|---|
| CN | 109606737 | 4/2019 |
| KR | 101120625 | 3/2012 |

\* cited by examiner

REUSABLE, LOW-SHOCK HOLD AND RELEASE DEVICE

CROSS-REFERENCE TO RELATED APPLICATIONS

This application is a continuation of International Application No. PCT/FR2021/050668, filed on Apr. 15, 2021, which claims priority to and the benefit of FR 2003837 filed on Apr. 16, 2020. The disclosures of the above applications are incorporated herein by reference.

FIELD

The present disclosure relates to the field of low-shock stacking and unstacking components.

BACKGROUND

The statements in this section merely provide background information related to the present disclosure and may not constitute prior art.

It is known to hold an appendix assembled or linked with other equipment by using a stacking tie rod, at least one end of which is clamped between at least two tightening elements, the at least two tightening elements being integral with the appendix or the other equipment, and being configured to hold the end of the tie rod tight, so as to provide the assembly connection between the other equipment and the appendix. It is also known practice to release the stacking tie rod by loosening the tightening elements using pyrotechnic or non-pyrotechnic means.

The disadvantages of these devices for holding and releasing a stacking tie rod are, on the one hand, to generate a shock during the release of the stacking tie rod, in particular, in the case of the use of a pyrotechnic means, on the other hand, not to be able to be reset "in situ", in other words not to be able to be reused without dismantling. Finally, the size of the existing devices is not suited to all the needs, in particular the needs related to nanosatellites.

SUMMARY

The aim of the present disclosure is therefore to propose a solution to all or part of these problems.

To this end, the present disclosure relates to a reusable device for holding and releasing a transmission bar, the device comprising a tightening component, a hold and release component and at least one loosening component, the hold and release component comprising a plurality of segments, at least two segments of the plurality of segments each comprising a first bearing surface configured to bear on a part of the transmission bar, such that the part of the transmission bar is held pressed between and/or bearing on said first bearing surface of at least two segments when the plurality of segments is in a holding configuration under the effect of a tightening pressure generated by the tightening component, at least two other segments of the plurality of segments each comprising a second bearing surface configured to bear on one end of the at least one loosening component, each segment of the at least two other segments also being able to be a segment of the at least two segments, the at least one loosening component being made of a first single-acting shape memory material, said first material being configured so that from a transition temperature, each end of the at least one loosening component exerts, on the second bearing surface of each segment of the at least two other segments, a loosening pressure, said loosening pressure compensating for the tightening pressure generated by the tightening component, by deforming the tightening component, so as to place the plurality of segments of the hold and release component in the release configuration, in which the part of the transmission bar is released.

According to one form, the present disclosure comprises one or more of the following characteristics, alone or in a technically acceptable combination.

According to one form, the deformation of the tightening component is a plastic deformation, the tightening component being made of a second material capable of being plastically deformed so as to generate the tightening pressure necessary for holding the plurality of segments in the holding configuration; the tightening pressure thus generated by the tightening component being determined so as to be able to be compensated by the loosening pressure exerted in the opposite direction by the at least one loosening component, so that the plurality of segments assume the release configuration; the plastic deformation is produced when a temperature of the first material of the loosening component is increased from the transition temperature, under the effect of the pressure then exerted by the at least one loosening component on the second part of the surface of each segment of the plurality of segments.

According to this form, the second material is a conventional material, for example aluminum, or steel, capable of being plastically deformed, that is to say that its deformations may be irreversible, beyond elastic threshold.

According to these arrangements, the device is configured to switch from the holding configuration to the release configuration of the stacking tie rod without shock, for example without pyrotechnic or elastic shock. Only manual resetting of the device is possible, with the replacement of the irreversibly plastically deformed tightening component, which then requires dismantling of the device.

According to one form, the deformation of the tightening component is an elastic deformation of a second material of the tightening component (3, 3'), configured to resume a first shape after having undergone said elastic deformation.

According to one form, the second material is a material that is not only elastic, but also superelastic, that is to say that the extension of the reversible deformation of the second material is much greater than that of a material that is simply elastic.

According to these arrangements, the deformations of the elastic or superelastic material are reversible, unlike the form in which the second material is a material capable of being plastically deformed.

According to one form, the second superelastic material can be a superelastic shape memory material.

According to these arrangements, the extension of the reversible deformation can be much greater than with a non-shape memory superelastic material.

According to one form, the second superelastic shape memory material can, for example, be selected from the materials of the following non-exhaustive list: NiTiCu, CuAlNi, CuAlBe, CuZnAl, FeMnAlNi.

According to these arrangements, the device is configured to alternately hold or release the end of the transmission bar, and in particular to switch from the release configuration to the holding configuration, in other words the device is reversible, that is to say resettable, "in situ" without manual intervention.

According to these arrangements, the tightening component assists the return of the at least one loosening component to its initial shape.

According to one form, the tightening and loosening components can be merged into one and the same so-called tightening/loosening component which then performs the two functions (tightening at low temperature and loosening at high temperature). The material of the tightening/loosening component is then a two-way shape memory material which allows the component to return to its initial shape at low temperature without assistance.

According to one form, the tightening component comprises at least one longitudinal element, and in which the hold and release component comprises a first part comprising two segments and a second part comprising two other segments of the plurality of segments, the at least one longitudinal element being attached integrally by each end of the at least one longitudinal element respectively to one of the two segments of the first part and to one of the other two segments of the second part.

According to one form, the at least one loosening component is longitudinal and disposed parallel to the at least one longitudinal element of the tightening component.

According to one form, the tightening component comprises two longitudinal elements, and the device comprises two longitudinal loosening components, each disposed parallel to one of the two longitudinal elements.

According to one form, the two segments of the first part form a single piece.

According to one form, the two segments of the second part form a single other piece.

According to one form, the tightening component is in the form of a hollow cylinder around the plurality of segments.

According to one form, a third bearing surface of at least two segments of the plurality of segments is configured to bear on an internal surface of the hollow cylinder formed by the tightening component.

According to one form, when the plurality of segments is in a holding configuration, the first bearing surface of each segment of the at least two segments takes a threaded cylindrical bearing shape. According to these arrangements, the thread being configured to receive a complementary thread from the end of the transmission bar, the transmission bar can be screwed into the device in the holding configuration, and release without unscrewing.

According to one form, when the plurality of segments is in a holding configuration, the first bearing surface of each segment of the at least two segments takes a conical bearing shape.

According to one form, the bearing shape may for example be conical or spherical or in the form of a chute.

According to these arrangements, the bearing shape makes it possible to receive a part of the transmission bar, one end for example, said part having a complementary shape, for example a cone or sphere shape, so that a partial release configuration of said bearing shape can be defined, in which the load tension of the transmission bar is reduced. This configuration is particularly advantageous for reducing the preloads commonly installed in the stacking columns or in the bearings. For the bearings, it may be advantageous to relax this preload after a launch phase of a space vehicle on which is mounted a piece secured via the transmission bar, phase during which this preload must be held high to pass the vibrations without clearance, while it is preferable to reduce this load during the following phases of the life of the bearing to decrease the internal stresses, reduce the frictional torques and thus extend the service life and allow a lighter motorization to drive the bearing in rotation. For the stacking columns, this makes it possible to reduce the elastic energy stored in order to reduce the shock generated during the sudden release of a stacking tie rod.

The present disclosure also relates to a tension-holding system, comprising a device according to any of the forms of the present disclosure described above, and comprising the transmission bar, the transmission bar being a tension-biased tie rod along an axis of the transmission bar, when the hold and release component is in the holding configuration.

The present disclosure also relates to a rotation-holding system, comprising a device according to any of the forms described above, and comprising the transmission bar, the transmission bar being movable in rotation about an axis of the transmission bar between a first angular position and a second angular position, when the hold and release component is in the release configuration.

According to these arrangements, the rotation-holding system can serve as a stacking point during vibrations during the phase of launching the vehicle, when the hold and release component is in the holding configuration, before going into the release configuration, by heating of the loosening component, for the deployment of an appendix, for example a solar panel, motorized with an ancillary spring, then to lock in the deployed position at the end of deployment, the transmission bar being again tight between the segments of the hold and release component, after cooling of the loosening component.

According to one form, the tightening component comprises at least one spring or at least one set of elastic washers, the at least one spring or the at least one set of elastic washers being compressed between a face of a segment of the hold and release component and a face of another segment of the hold and release component, said segment of the hold and release component being housed within a cavity formed in said other segment of the hold and release component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
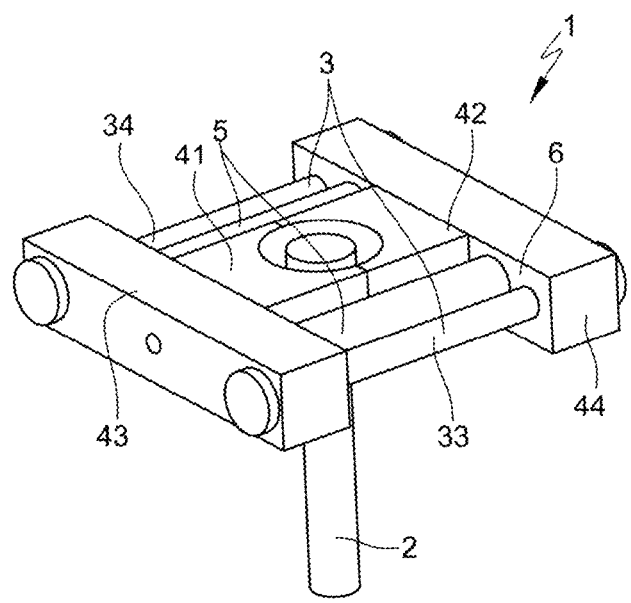
FIG. 1 is a perspective view of a device according to one form of the present disclosure in closed configuration (stacking)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
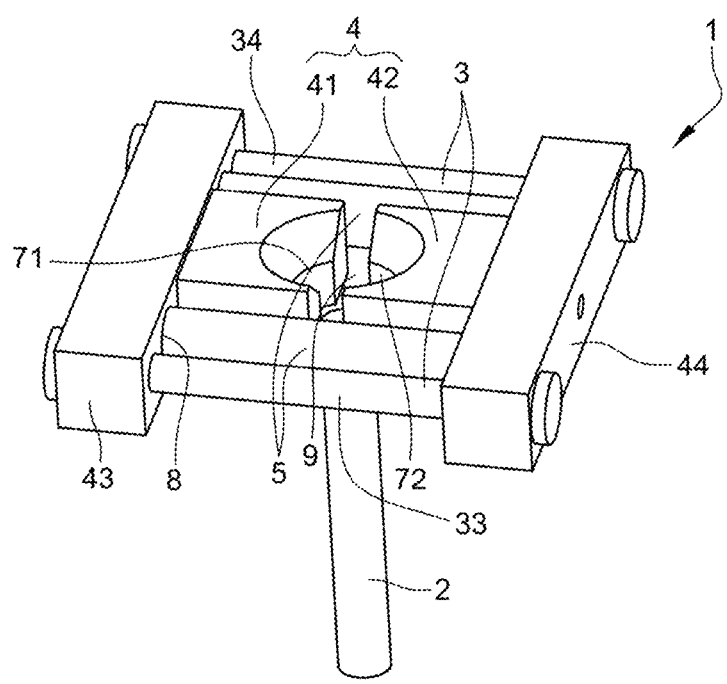
FIG. 2 is another perspective view of the device according to the form of FIG. 1 in open configuration (unstacking)
Figure 3:
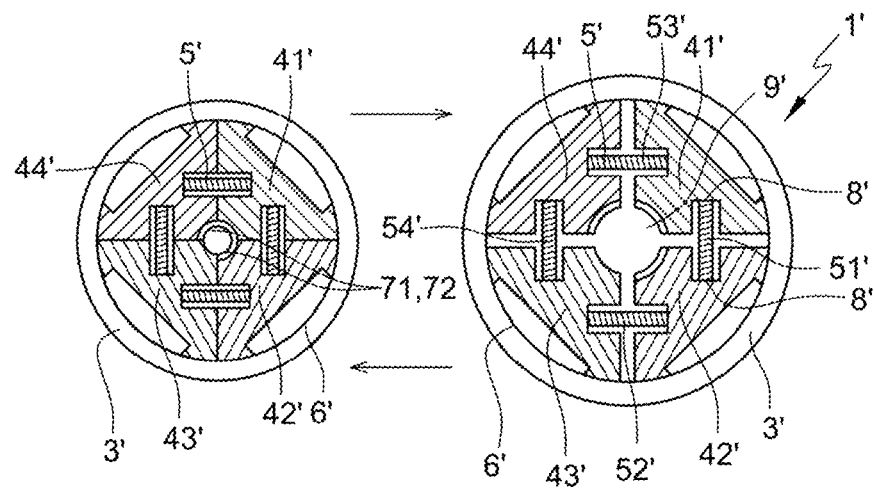
FIG. 3 is a sectional view of a device according to another form of the present disclosure.

The present disclosure relates to a device 1, 1', 1" for holding and then releasing, or for stacking and then unstacking, a transmission bar 2, 2'. FIGS. 1 and 2 illustrate an form 1 of the device according to the present disclosure, FIG. 3 illustrates another form 1' of the device according to the present disclosure, and FIGS. 6, 7, 8 and 9 illustrate yet another form of the device 1" according to the present disclosure. The device is reusable in the sense that, after having been used once to hold and then to release the transmission bar 2, 2', it can again resume the holding configuration without it being necessary to "reset" it manually.

Figure 6:
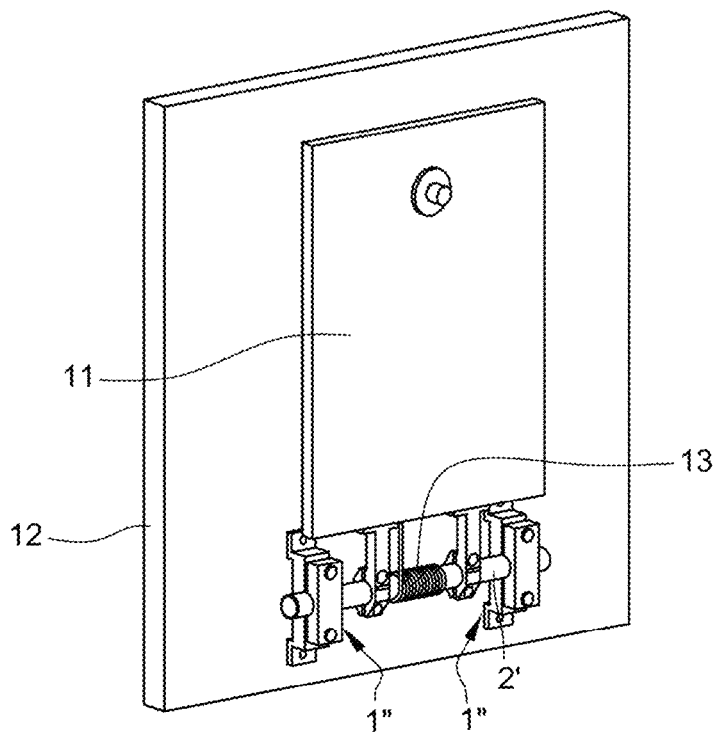
FIG. 6 is a perspective view of a device according to a third form of the present disclosure, in folded and locked configuration.
Figure 7:
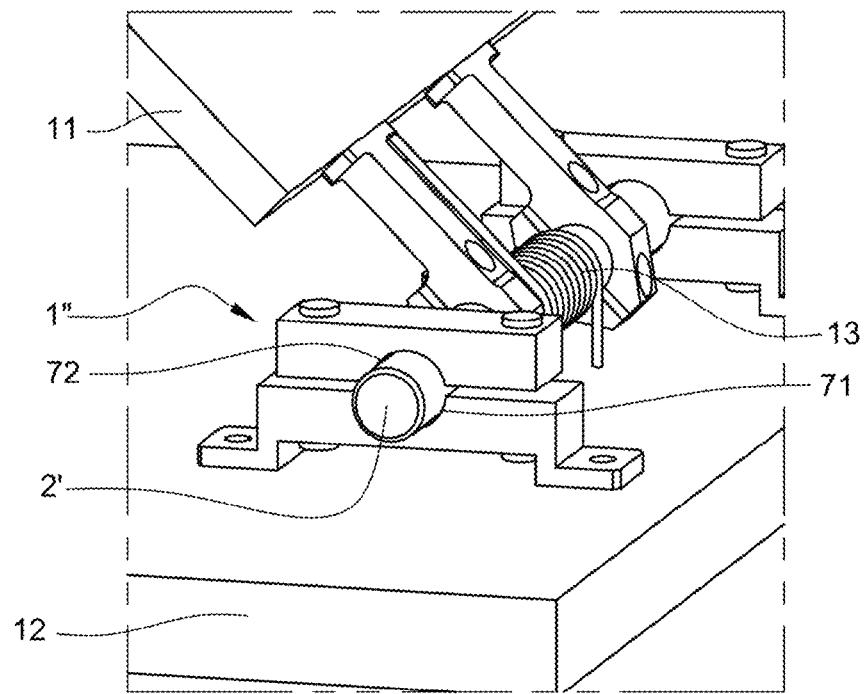
FIG. 7 is a perspective view of the device according to the third form of the present disclosure, during deployment.
Figure 8:
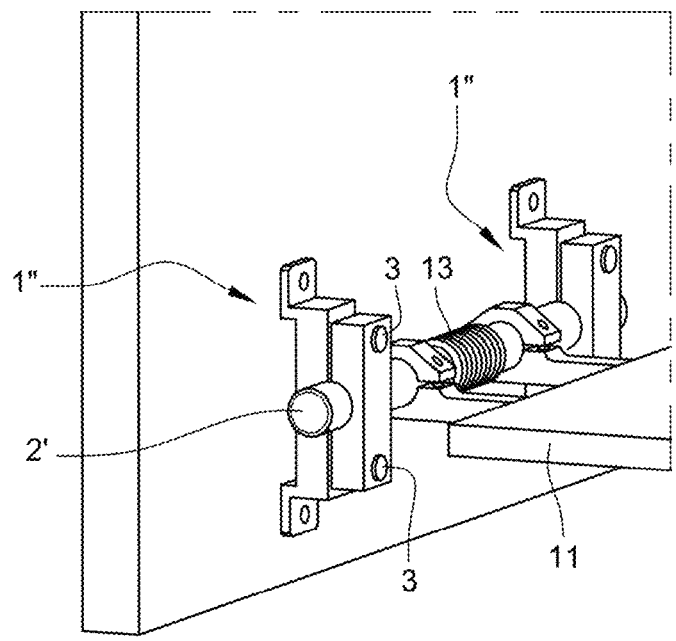
FIG. 8 is a perspective view of the device according to the third form of the present disclosure, in deployed and locked configuration.
Figure 9:
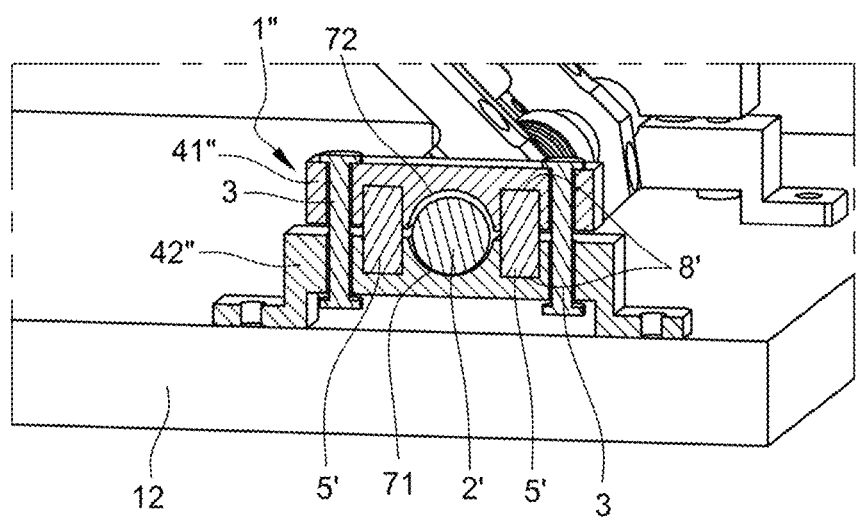
FIG. 9 is a sectional view of the device according to the third form of the present disclosure.

The transmission bar 2, 2' designates here any type of object intended to transmit an effort or a holding force to an ancillary object 11, fixed to the transmission bar, and therefore fixed, via the transmission bar 2, 2', to the hold and release device 1, 1', 1" according to the present disclosure. The device 1, 1', 1" according to the present disclosure is thus a means for securing the ancillary object 11 to a part 12 of a main object, not shown in the figures, which carries the device 1, 1', 1" according to the present disclosure and to which the device 1, 1', 1" according to the present disclosure is integrally attached. The main object can for example be a vehicle, a space vehicle, a satellite for example. Those skilled in the art will understand that these examples are not limiting and the main object can take other form. The ancillary object 11 may for example be a solar generator 11 secured to a wall 12 (i.e., a part) of the vehicle (i.e., a main object). The ancillary object 11 may have to be held firmly on the vehicle, with a minimum of clearance and according to a maximum effort load undergone by the transmission bar and transmitted to the ancillary object 11, so that the ancillary object 11 is mechanically completely integral with the vehicle, during a phase of the implementation of the vehicle which carries the ancillary object 11, said phase possibly being, for example, a phase of launching a satellite; during this launch phase, a significant preload may be necessary to pass the vibrations which accompany this phase without clearance; during another phase of the implementation of the vehicle which carries the ancillary object 11, the ancillary object may have to be released, totally or partially to introduce a clearance, by reducing or canceling the effort load undergone by the transmission bar 2, 2' and transmitted to the ancillary object 11; this partial release can be used for example to allow the ancillary object 11 to deploy from a first position to a second position as illustrated in FIGS. 6, 7 and 8. The device 1, 1', 1" can also be used for some gear before it enters atmosphere or to link/release the satellites together during a "cluster" launch.

A first form of the present disclosure will now be described with reference to FIGS. 1 and 2. According to this first form, the device 1, for holding and releasing a transmission bar 2, comprises a hold and release component 4, a tightening component 3, and a loosening component 5.

According to this first form of the present disclosure, the hold and release component 4 comprises a plurality of segments 41, 42, 43, 44. The segments 41 and 43 may for example be mechanically integral, until they form only one piece; likewise, segments 42 and 44 may for example be mechanically integral, even forming only one other piece. At least two segments 41, 42 of the plurality of segments 41, 42, 43, 44 which form the hold and release component 4, each comprise a bearing surface 71, 72 configured to bear on one end of the transmission bar 2; the end of the transmission bar 2 is thus held pressed between said bearing surface 71, 72 of at least two segments 41, 42, when the plurality of segments 41, 42, 43, 44, is in a holding configuration.

The plurality of segments 41, 42, 43, 44, forming the hold and release component 4 is in the holding configuration under the effect of a tightening pressure generated by the tightening component 3. According to the first mode of form, the tightening component 3 comprises at least one longitudinal element 33, 34, the at least one longitudinal element 33, 34 being attached integrally by each end respectively to one 43 of the two segments 41, 43 and to one 44 of the other two segments 42, 44.

The tightening component 3 is configured to exert said tightening pressure; thus for example, said tightening component 3 can undergo an elastic deformation, the tightening component 3 being made of a material capable of being elastically deformed to generate the tightening pressure necessary for holding the plurality of segments 41, 42, 43, 44 in the holding configuration.

The elastic deformation is selected, depending on the material considered, so that the tightening pressure is sufficient to ensure the holding of the plurality of segments 41, 42, 43, 44 in the holding configuration, that is to say by exerting the necessary load on a part of the transmission bar 2.

On the other hand, the tightening pressure is compensated by a loosening pressure exerted in the opposite direction by the loosening component 5; for this purpose, the loosening component can be made, for example, in a single-acting shape memory material, configured so that from a transition temperature, the loosening pressure exerted by each end of the loosening component 5 on a bearing surface 8 of two other segments 43, 44, among the plurality of segments 41, 42, 43, 44, so as to compensate for the tightening pressure and to separate the segments 43, 44, and to cancel the load exerted by the segments 41 and 42 on the transmission bar 2; Thus, the plurality of segments 41, 42, 43, 44, take the release configuration, and release the transmission bar 2.

The spacing of the segments 43 and 44, which accompanies the release of the transmission bar 2, also causes an additional deformation of the tightening component 3, integrally attached to said segments 43 and 44; this additional deformation can be plastic or elastic.

If the material of the tightening component 3 is a conventional material, for example aluminum, or steel, and the induced additional deformation exceeds the elastic deformation threshold of said material, then the deformation is plastic and irreversible. In this case, a manual reset of the device is desired to return the device 1 to its holding configuration, in particular with the manual replacement of the deformed tightening component 3, which requires dismantling of the device. However, the device 1 configured with a tightening component made of conventional material makes it possible to switch from the holding configuration to the release configuration without shock, in particular without pyrotechnic or elastic shock.

If the material of the tightening component 3 is an elastic material, then the tightening component is configured to naturally resume its initial position after having been elastically deformed by the spacing of 43 and 44 induced by the loosening pressure exerted by the loosening component 5, when this loosening pressure disappears. If the material of the tightening component 3 is not only elastic, but also superelastic, the extension of the reversible deformation may be greater. When the material of the tightening component 3 is elastic, or even superelastic, the device therefore naturally returns to its holding configuration when the loosening pressure exerted by the loosening component 5 disappears.

If the material of the tightening component 3 is an elastic, even superelastic, and shape memory material, then the extension of the reversible deformation can be even much greater than with a superelastic non-shape memory material. The superelastic shape memory material can, for example, be selected from the alloys of the following non-exhaustive list: NiTiCu, CuAlNi, CuAlBe, CuZnAl, FeMnAlNi.

If the material of the tightening component 3 is an elastic, superelastic, or superelastic shape memory material, then the device 1 is configured to alternately hold or release the end of the transmission bar 2, and in particular to return naturally, when the loosening pressure disappears, from the release configuration to the holding configuration, in other words the device is reversible, that is to say resettable, "in situ". The loosening pressure disappears due to the stopping of the heating of the shape memory alloy loosening component which can then cool down and return to its initial shape under the effect of or thanks to the elastic tightening element.

In order for the loosening component 5 to exert the loosening pressure necessary for the passage from the holding configuration to the release configuration of the device 1, the loosening component 5 can be made, at least in part, of single-acting a shape memory material, i.e. configured so that from a transition temperature, the loosening pressure exerted by each end of the loosening component 5 on the bearing surface 8 of the segments 43, 44 compensates for the tightening pressure of the tightening component 3. The material of the loosening component 5 being shape memory, it returns to its initial shape naturally (two-way memory effect) or with the assistance of the loosening element (assisted two-way memory effect) when the temperature returns to its initial temperature.

According to these arrangements, the tightening component 3 assists the return of the at least one loosening component 5 to its initial shape.

According to one form, the tightening and loosening components can be merged into one and the same so-called tightening/loosening component which then performs the two functions (tightening at low temperature and loosening at high temperature). The material of the tightening/loosening component is then a two-way shape memory material which allows the component to return to its initial shape at low temperature without assistance.

According to one form, the tightening component comprises two longitudinal elements 33, 34, and the device comprises two longitudinal loosening components 5, each disposed parallel to one of the two longitudinal elements 33, 34 of the tightening component 3.

According to one form, the at least one loosening component 5 is longitudinal and disposed parallel to the longitudinal element 33, 34 of the tightening component 3.

A second form of the device 1' according to the present disclosure will now be described with reference to FIG. 3. According to this second form, the device 1' comprises a tightening component 3' having the shape of a hollow cylinder around the plurality of segments 41', 42', 43', 44' of the hold and release component 4.

According to this second form, the segments of the plurality of segments 41', 42', 43', 44' of the hold and release component 4 comprise a bearing surface 10 configured to bear on the tightening component 3, on the internal surface of the hollow cylinder.

According to this second form, the loosening component 5 comprises four loosening components 51', 52', 53', 54', i.e. one for each pair of segments of the hold and release component 4, each loosening component 51', 52', 53', 54' being configured so that each of its ends bears respectively on a bearing surface 8' of a segment of the pair of segments associated with it.

FIG. 3 shows, on the left of the figure, the device 1' in the holding configuration, the tightening component 3' holding the segments 41', 42', 43', 44' of the hold and release component 4 tight against each other, pressing radially on the bearing surface 10 of each of these segments. FIG. 3 shows, on the right of the figure, the device 1' in the release configuration, when each loosening component 51', 52', 53', 54' has been heated to a temperature greater than or equal to the transition ending temperature of the shape memory material constituting, at least in part, these loosening components. The loosening pressure exerted by each loosening component 51', 52', 53', 54' on the pair of segments of the hold and release component 4 associated with it, compensates for the tightening pressure of the tightening component 3' and pulls apart the segments of each pair of segments from the hold and release component 4.

Figure 4:
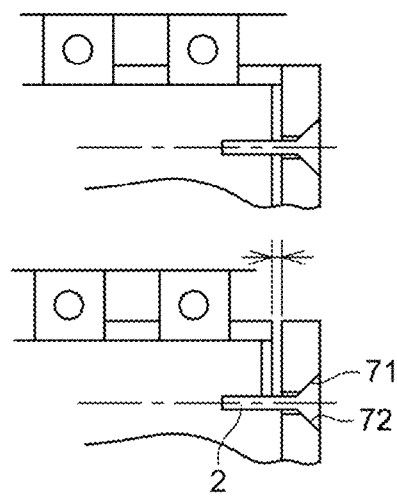
FIG. 4 is a sectional view of a device according to any of the forms of the present disclosure configured to receive a conical end of a stacking tie rod.

According to the first or the second form, the bearing surface 71, 72 of each segment of the plurality of segments 41', 42', 43', 44' of the hold and release component 4 is configured to take a conical or spherical or threaded or other bearing shape; with a conical bearing shape, when the device 1, 1' is in the holding configuration with the segments 41', 42', 43', 44' tightened against each other, the part of the transmission bar 2 is held inside the conical bearing shape, as illustrated in FIG. 4. Thus, if the held part, the end for example, also has a conical or spherical shape for example, complementary to the conical shape of the bearing surfaces 71, 72, then a partial release configuration of said bearing shape can be defined, in which the load tension of the transmission bar 2 is reduced, as illustrated below of FIG. 4. This configuration is particularly advantageous for reducing the preloads commonly installed in the stacking columns or in the bearings. For the bearings, it may be interesting to relax this preload—after a phase of lunching a space vehicle on which is mounted a piece secured via the transmission bar, phase during which this preload must be held high to pass the vibrations without clearance, while it is preferable to reduce this load during the following phases of the life of the bearing to decrease the internal stresses, reduce the frictional torques and thus lengthen the life and allow a lighter motorization of the bearing. For the stacking columns, this reduces elastic energy stored in such a way as to reduce the shock generated during the sudden release of a stacking tie rod.

Figure 5:
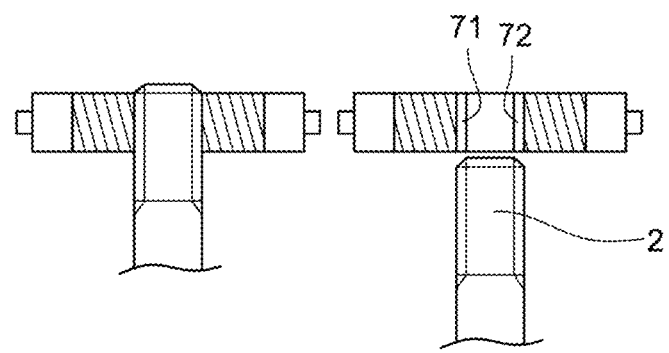
FIG. 5 is a sectional view of a device according to another form of the present disclosure configured to receive a threaded end of a stacking tie rod.

According to the first or the second form, the conical or cylindrical bearing shape of the bearing surface 71, 72 of each segment of the plurality of segments 41', 42', 43', 44' of the hold and release component 4 can be threaded, or provided with chutes. According to these arrangements, the thread being configured to receive a complementary thread of the part of the transmission bar 2, or the chutes being configured to receive a complementary shape of the part of the transmission bar 2, the transmission bar 2 can be screwed into the device or clamped in the chutes in the holding configuration, and release without unscrewing, as illustrated on the right part of FIG. 5.

According to one aspect, the present disclosure relates to a hold system comprising a device 1, 1' as described above, and the transmission bar 2 held by the device 1, 1".

According to the first form or the second form of the device described above, the transmission bar 2 is a tie rod tension-biased along an axis of the transmission bar 2, when the hold and release component 4 is in the holding configuration.

Another form of the hold device 1" and of the hold system according to the present disclosure will now be described with reference to FIGS. 6, 7, 8 and 9, in which the transmission bar 2 being movable and actuated in rotation about an axis of the transmission bar, between a first angular position and a second angular position, when the hold and release component 4 is in the release configuration.

According to these arrangements, illustrated by FIGS. 6 to 9, the device can serve as a stacking point during vibrations during the phase of lunching the vehicle, when the hold and release component 4 is in the holding configuration, before going into the release configuration, by heating the loosening component, for the deployment of an appendix 11, for example a solar panel 11, motorized for example with an ancillary spring 13, then to lock in the deployed position at the end of deployment, the transmission bar being again tightened between the segments of the hold and release component, after cooling of the loosening component.

Figure 10:
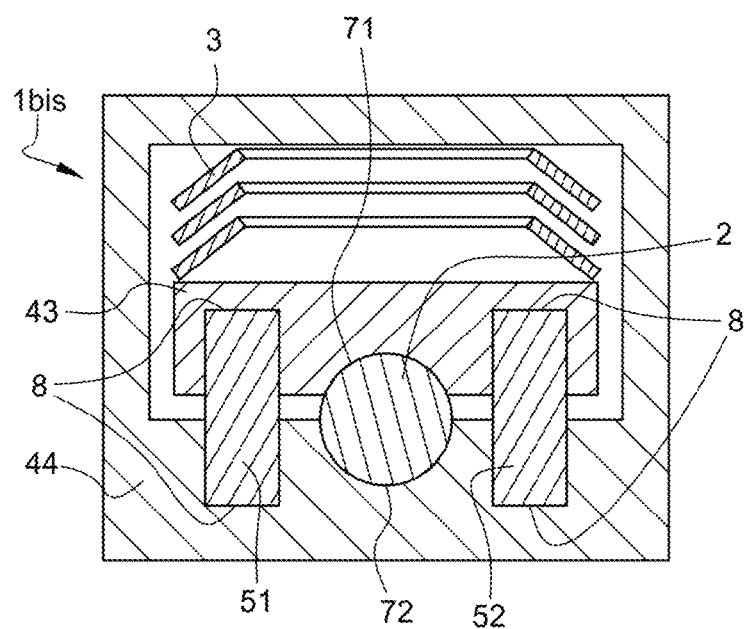
FIG. 10 is a sectional view of the device according to another form of the present disclosure.

Another form of the device 1bis is according to the present disclosure will now be described with reference to FIG. 10. According to this form, the device 1bis is comprises a tightening component 3 taking the shape of at least one spring or at least one set of elastic washers, of the Belleville type.

According to this form, the hold and release component 4 comprises two segments 43, 44 which each comprise a first bearing surface 71, 72 configured to bear on the transmission bar 2, and a bearing surface, and a second bearing surface 8 configured to bear on one end of the at least one loosening component 51, 52.

According to this form, one of the segments 43 of the hold and release component is housed inside a cavity formed in the other segment 44 of the hold and release component, so that the spring(s) 3 or the set(s) of elastic washers 3 are compressed between one face of the segment 43 and one face of the other segment 44 of the hold and release component, to hold segment 43 and the other segment 44 of the hold and release component in the holding configuration. The loosening component(s) 51, 52 being configured to bear on the second bearing surface 8 located on the one hand on another face of the segment 43 and another face of the other segment 44 of the hold and release component.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A reusable device for holding and releasing a transmission bar, the device comprising:
   a tightening component;
   a hold and release component; and
   at least one loosening component, wherein
   the hold and release component comprises a plurality of segments, wherein:
      at least two segments of the plurality of segments each comprises a first bearing surface configured to bear on a part of the transmission bar, so that the part of the transmission bar is held pressed between and/or in bearing on the first bearing surface of the at least two segments when the plurality of segments is in a holding configuration under an effect of a tightening pressure generated by the tightening component,
      at least two other segments of the plurality of segments each comprises a second bearing surface configured to bear on one end of the at least one loosening component,
      each segment of the at least two other segments can also be a segment of the at least two segments, and
      the at least one loosening component is made of a first single-acting shape memory material, the first material is configured so that, from a transition temperature, each end of the at least one loosening component exerts, on the second bearing surface of each segment of the at least two other segments, a loosening pressure, wherein the loosening pressure compensates for the tightening pressure generated by the tightening component, by deforming the tightening component, so as to place the plurality of segments of the hold and release component in a release configuration, in which the part of the transmission bar is released.

2. The reusable device according to claim 1, wherein the deformation of the tightening component is an elastic deformation of a second material of the tightening component, the tightening component is configured to take back a first shape after having undergone the elastic deformation.

3. The reusable device according to claim 1, wherein:
   the tightening component comprises at least one longitudinal element,
   the hold and release component comprises a first part comprising two segments and a second part comprising two other segments of the plurality of segments, and
   the at least one longitudinal element is attached integrally by each end of the at least one longitudinal element respectively to one of the two segments of the first part and to one of the other two segments of the second part.

4. The reusable device according to claim 1, wherein the tightening component is in the shape of a hollow cylinder around the plurality of segments.

5. The reusable device according to claim 1, wherein, when the plurality of segments is in a holding configuration, the first bearing surface of each segment of the at least two segments has a conical, spherical or trough-shaped bearing shape.

6. A tension-holding system comprising:
   the reusable device according to claim 1, and
   the transmission bar, wherein the transmission bar is a tie rod tension-biased along an axis of the transmission bar, when the hold and release component is in the holding configuration.

7. A rotation-holding system, comprising:

the reusable device according to claim 1, and the transmission bar, the transmission bar is movable in rotation about an axis of the transmission bar between a first angular position and a second angular position, when the hold and release component is in the release configuration.

8. The reusable device according to claim 1, wherein:

the tightening component comprises at least one spring or at least one set of elastic washers, the at least one spring or the at least one set of elastic washers is compressed between one face of one segment of the hold and release component and one face of another segment of the hold and release component, and the segment of the hold and release component is housed within a cavity formed in the other segment of the hold and release component.

\* \* \* \* \*